No. 766,895. PATENTED AUG. 9, 1904.
N. PAYNE & A. P. GUYNES.
NUT LOCK.
APPLICATION FILED JAN. 11, 1904.
NO MODEL.

Witnesses
O. E. Murray.
M. A. Schmidt.

A. P. Guynes, Inventors.
N. Payne
by Milo B. Stevens & Co. Attorneys.

No. 766,895.

Patented August 9, 1904.

UNITED STATES PATENT OFFICE.

NEWTON PAYNE AND ALLEN PERRY GUYNES, OF APPLEBY, TEXAS.

NUT-LOCK.

SPECIFICATION forming part of Letters Patent No. 766,895, dated August 9, 1904.

Application filed January 11, 1904. Serial No. 188,561. (No model.)

*To all whom it may concern:*

Be it known that we, NEWTON PAYNE and ALLEN PERRY GUYNES, citizens of the United States, residing at Appleby, in the county of Nacogdoches and State of Texas, have invented certain new and useful Improvements in Nut-Locks; and we do hereby declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in nut-locks, and comprises a washer adapted to be placed under a nut and a loop hinged to the washer to embrace the nut so that it cannot jar or work loose.

The invention also comprises means for preventing rotation of the washer and the accidental disengagement of the loop.

Figure 1:
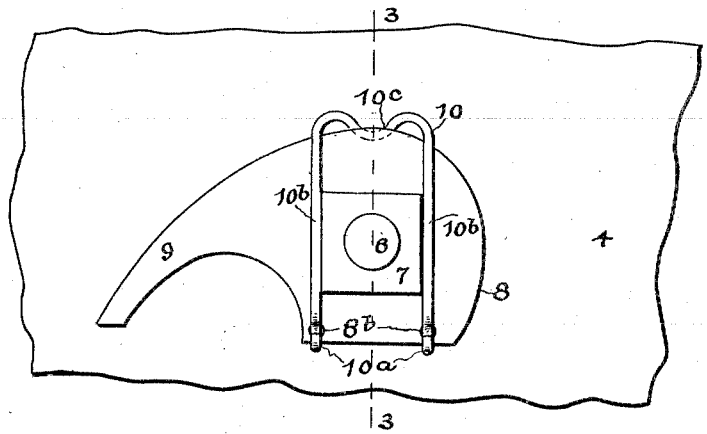
Figure 2:
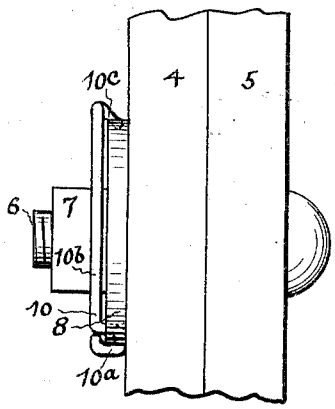
Figure 3:
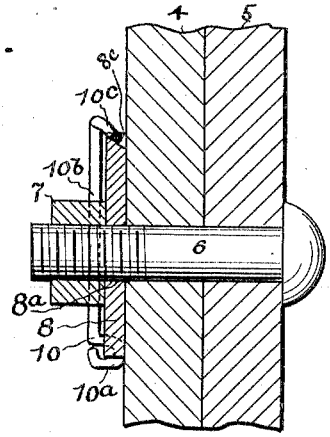
Figure 4:
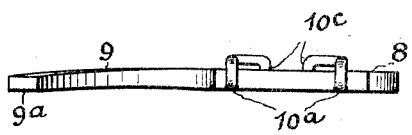

In the accompanying drawings, Figures 1 and 2 are respectively side and end elevations of our invention, showing the application of the same. Fig. 3 is a vertical section on the line 3 3 of Fig. 1. Fig. 4 is an edge view of the invention detached.

Referring specifically to the drawings, 4 and 5 indicate two pieces of timber or metal fastened together by a bolt 6, having a threaded end on which there is a nut 7.

Our improved nut-lock comprises a washer 8, which is placed on the bolt under the nut and has a hole $8^a$ to admit the bolt. The washer has a spring-tongue 9 projecting from one side thereof and extending beyond the plane of the main body of the washer, as shown in Fig. 4. When the nut is screwed home, the spring-tongue will be straightened and the friction thereof will securely hold the washer against rotation. The sharp edge $9^a$ of the spring-tongue will also bite into the piece 4 and assist to hold the washer.

At 10 is indicated a loop made of heavy wire, which is hinged at its ends to the washer, at the lower edge thereof, hooks $10^a$ being formed in said ends, which engage holes $8^b$ in the washer. The loop has parallel sides $10^b$, which lie against opposite sides of the nut when in locking position. The outer end of the loop is bent downwardly to form a spring-finger $10^c$, which snaps over the upper edge of the washer into a depression $8^c$, made in the upper edge thereof, and thus securely holds the loop in locking position.

In use the washer is first placed on the bolt, the loop being swung out of the way of the nut, which is then screwed home, causing the spring-tongue to assume the position heretofore described to prevent rotation of the washer. The loop is then swung over the nut, so that the sides $10^b$ thereof engage opposite sides of the nut, which then cannot turn and will thus be securely locked on the bolt. The spring-finger $10^c$ is snapped over the upper edge of the washer into the depression $8^c$, as heretofore described, which will prevent the loop from accidentally swinging off the nut. This permits the device to be used without regard to the position of the bolt. It will effectively hold the nut, even though the bolt extends in a vertical direction with the nut on the bottom.

It is obvious that our invention may be used on rail-joints, engine parts, or in any other places where it is desirable to securely lock a nut on the bolt to prevent its jarring or working loose.

Having thus described our invention, what is claimed as new, and desired to be secured by Letters Patent, is—

1. A nut-lock comprising a perforated washer having a depression in the edge thereof and a projecting spring-tongue, a loop hinged to the washer and extending along opposite sides of the nut, and a spring-finger on the loop extensible over the edge of the washer into the depression.

2. A nut-lock comprising a perforated washer having a depression in the edge thereof and a projecting spring-tongue having a biting-point, a loop hinged to the washer and extending along opposite sides of the nut, and a spring-finger on the loop extensible over the edge of the washer into the depression.

In testimony whereof we affix our signatures in presence of two witnesses.

NEWTON PAYNE.
ALLEN PERRY GUYNES.

Witnesses:
 H. R. POOLITTLE,
 G. C. CLARK.